United States Patent
Meyer

(10) Patent No.: US 6,984,710 B2
(45) Date of Patent: Jan. 10, 2006

(54) ALKOXYLATED ALKYLPHENOL-FORMALDEHYDE-DIAMINE POLYMER

(75) Inventor: George Richard Meyer, Missouri City, TX (US)

(73) Assignee: Nalco Energy Services, L.P., Sugar Land, TX (US)

( * ) Notice: Subject to any disclaimer, the term of this patent is extended or adjusted under 35 U.S.C. 154(b) by 16 days.

(21) Appl. No.: 10/684,250

(22) Filed: Oct. 13, 2003

(65) Prior Publication Data

US 2005/0080221 A1    Apr. 14, 2005

(51) Int. Cl.
*C08G 14/06*        (2006.01)

(52) U.S. Cl. ........................ 528/129; 528/142; 528/145

(58) Field of Classification Search ................ 528/129, 528/142, 145
See application file for complete search history.

(56) References Cited

OTHER PUBLICATIONS

N. Zaki, A. M. Al-Sabagh, "De-emulsifiers for water-in-crude oil-emulsions", Carl Hanser Verlag, München, Tenside Surf. Det., pp. 12-17, 1997.

*Primary Examiner*—Duc Truong
(74) *Attorney, Agent, or Firm*—Michael B. Martin; Thomas M. Breininger

(57) ABSTRACT

An alkoxylated alkylphenol-formaldehyde-diamine polymer prepared by alkoxylating an alkylphenol-formaldehyde-diamine polymer and use of the alkoxylated alkylphenol-formaldehyde-diamine polymer to resolve water-in-oil emulsions, especially emulsions of water in crude oil.

17 Claims, No Drawings

US 6,984,710 B2

ALKOXYLATED ALKYLPHENOL-FORMALDEHYDE-DIAMINE POLYMER

TECHNICAL FIELD

This invention relates to compositions and methods of resolving water-in-oil emulsions. More particularly, this invention concerns an alkoxylated alkylphenol-formaldehyde-diamine polymer and use of the polymer to resolve water-in-oil emulsions, particularly emulsions of water in crude oil.

BACKGROUND OF THE INVENTION

Crude oil produced from geological formations can contain various amounts of water. Water and crude oil are naturally non-miscible. However, when naturally occurring interfacially active compounds are present, these compounds can aggregate at the oil and water interface and cause water to form droplets within the bulk oil phase. During crude oil lifting through production tubings, the oil and water encounters increased mixing energy from rapid flow through chokes and bends. This additional mixing energy can emulsify the oil and water. This oil external, water internal two-phase system is commonly referred to as a crude oil emulsion. This emulsion can be quite stable.

The presence of water in crude oil can interfere with refining operations by inducing corrosion, increasing heat capacity and reducing the handling capacity of pipelines and refining equipment. Therefore, crude oil that is to be shipped out of the oilfield should be practically free of water and usually has a maximum water content limit of about three percent, depending on the type of crude and oil company specifications.

The crude oil associated emulsified water can also contain varying amounts of salts. These salts are detrimental to crude oil refining processes due to potential corrosion and foulant deposition in the refinery. In crude oil refining, desalting techniques comprise the deliberate mixing of the incoming crude oil with fresh "wash water" to extract the water soluble salts and hydrophilic solids therefrom. The mixing action of heat exchangers and mix valves can produce an emulsion. However, the crude oil routed to refinery distillation equipment is usually required to have less than 0.5 percent water.

Primary dehydration of the crude oil occurs in oil field water oil separation systems such as "free water knock out" and "phase separators". Refineries employ electrostatic desalters to separate crude oil from the wash water. Quite often these systems are not adequate for efficient separation due to factors such as overcapacity, unexpected production changes and system underdesigns. In these cases, emulsion breaking chemicals are added to the production or refining processes to assist and promote rapid separation of water from oil.

Commonly used emulsion breaking chemicals include alkylphenol formaldehyde resin alkoxylates (AFRA), polyalkylene glycol (PAG), organic sulfonates, and the like. These compounds, however, may not provide satisfactory performance in all instances. Accordingly, there is an ongoing need for new, economical and effective chemicals and processes for resolving emulsions into their component parts of oil and water or brine.

SUMMARY OF THE INVENTION

This invention is an alkoxylated alkyphenol-formaldehyde-diamine polymer prepared by reacting 1 molar equivalent of one or more diamines, 1 to about 10 molar equivalents of one or more alkylphenols and about 2 to about 14 molar equivalents of formaldehyde to form an alkylphenol-formaldehyde-diamine polymer and then reacting the alkylphenol-formaldehyde-diamine polymer with about 5 to about 3,500 molar equivalents of one or more alkylene oxides.

DETAILED DESCRIPTION OF THE INVENTION

The structures of the alkoxylated alkylphenol-formaldehyde-diamine polymers shown herein are representations of the repeating structural units contained in the polymer. No connectivity between the repeating units is shown as it is understood that the units can be randomly mixed in the polymer.

The alkoxylated alkylphenol-formaldehyde-diamine polymers of this invention are prepared by reacting 1 molar equivalent of one or more diamines, 1 to about 10 molar equivalents of one or more alkylphenols and about 2 to about 14 molar equivalents of formaldehyde to form an alkylphenol-formaldehyde-diamine polymer and then reacting the alkylphenol-formaldehyde-diamine polymer with about 5 to about 3,500 molar equivalents of one or more alkylene oxides.

As used herein, "alkoxy" means a $C_1$–$C_4$ alkyl group attached to the parent molecular moiety through an oxygen atom. Representative alkoxy groups include methoxy, ethoxy, propoxy, butoxy, and the like. Methoxy and ethoxy are preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, nonyl, decyl, octadecyl, and the like.

"Alkylene" means a divalent group derived from a straight or branched chain saturated hydrocarbon by the removal of two hydrogen atoms, for example methylene, 1,2-ethylene, 1,1-ethylene, 1,3-propylene, 2,2-dimethylpropylene, and the like.

"Alkylene oxide" means an aliphatic $C_2$ to $C_4$ epoxide, for example ethylene oxide, propylene oxide or butylene oxide.

"Alkylphenol" means a phenol of formula $R_1C_6H_4OH$ wherein $R_1$ is straight or branched $C_1$–$C_{18}$ alkyl.

"Aryl" means substituted and unsubstituted aromatic carbocyclic radicals and substituted and unsubstituted heterocyclic radicals having about 5 to about 14 ring atoms. Representative aryl include phenyl, naphthyl, phenanthryl, anthracyl, pyridyl, furyl, pyrrolyl, quinolyl, thienyl, thiazolyl, pyrimidyl, indolyl, and the like. The aryl is optionally substituted with one or more groups selected from hydroxy, halogen, $C_1$–$C_4$ alkyl, $C_1$–$C_4$ alkoxy and sulfonate.

"Diamine" means a molecule containing at least two reactive NH groups separated by a $C_2$–$C_{11}$ aliphatic or aromatic group, or a combination thereof. Aliphatic and aromatic groups include alkyl, cycloalkyl, heterocyclyl, aryl, and the like. The alkyl group may be interrupted by one or more NH groups, provided no NH groups are directly bonded to one another. One or both of the reactive NH groups may be incorporated into a heterocyclic ring such as piperazinyl, piperidinyl, and the like. The alkyl or aryl group is optionally substituted with one or more $C_1$–$C_3$ alkyl, aryl, hydroxy, alkoxy or halide groups or a combination thereof. Preferred diamines are selected from ethylenediamine, triethyenetetramine, tetraethylenepentamine, pentaethylenehexamine, aminoethylpiperazine, 1,2-diaminocyclohexane, o-phenylenediamine and p-phenylenediamine.

"Halogen" means Br, Cl, F or I.

The alkylphenol-formaldehyde-diamine polymer is preferably prepared by dissolving the alkyphenol(s) and diamine (s) in a hydrocarbon solvent and warming the mixture to about 60° C. to about 95° C., preferably about 75° C. Suitable solvents include aliphatic solvents such as kerosene and diesel and aromatic solvents such as xylene, toluene and light or heavy aromatic naphtha. The formaldehyde (as paraformaldehyde) is then added.

After the exotherm has subsided, the reaction mixture is maintained at reflux for one to five hours and condensate is continuously removed until the desired polymer molecular weight is obtained, typically about one to about three hours.

The alkylphenol-formaldehyde-diamine polymer is preferably alkoxylated by charging the alkylphenol-formaldehyde-diamine polymer to a reactor and heating to about 100° C. under nitrogen purge until the water content is less than about 0.1 percent. The reactor is then heated to about 150° C. and the desired amount of initial alkylene oxide is added in increments while the reactor pressure is maintained below about 50 psi. The alkylene oxide is allowed to react until the system pressure stabilizes. The reaction mixture is then cooled below 100° C. and about 0.01 to about 0.03 molar equivalents of aqueous base, preferably aqueous potassium hydroxide, is then added. The mixture is heated to reflux temperature and reflux is maintained until the water content is less than about 0.1 percent. The reactor is then heated to about 120° C. to about 150° C., depending on the nature of the alkylene oxide being added, and the alkylene oxide is charged slowly while the reactor pressure is maintained below about 50 psi. The alkylene oxide is allowed to react until the system pressure stabilizes.

In cases where the alkylphenol-formaldehyde-diamine polymer is reacted with more than one alkylene oxide, for example ethylene oxide and propylene oxide, the alkylene oxides may be added in random or block fashion.

Random addition of alkylene oxides involves both components being added to the polymer simultaneously, such that the rate of addition to the polymer is controlled by their relative amounts and reaction rates. An alkoxylated alkylphenol-formaldehyde-diamine polymer prepared by random addition of alkylene oxides or by a mixture of alkylene oxides is referred to herein as a "mixed copolymer".

In the case of block addition, either of the alkylene oxides is added first to the polymer and allowed to react. The other alkylene oxide is then added and allowed to react. An alkoxylate prepared by block addition of alkylene oxides is referred to herein as a "block copolymer".

In a preferred aspect of this invention, the alkylene oxides comprise ethylene oxide and propylene oxide.

In another preferred aspect, the ethylene oxide and propylene oxide are added in block fashion.

In another preferred aspect, the ethylene oxide and propylene oxide are added in the sequence ethylene oxide-propylene oxide.

In another preferred aspect, the ethylene oxide and propylene oxide are added in the sequence ethylene oxide-propylene oxide-ethylene oxide.

In another preferred aspect of this invention, the alkylphenol-formaldehyde-diamine polymer is reacted with about 650 to about 800 molar equivalents of ethylene oxide/propylene oxide.

In another preferred aspect, the alkoxylated alkylphenol-formaldehyde-diamine polymer is prepared by reacting about 1 molar equivalent of one or more alkylphenols, about 2 to about 7 molar equivalents of formaldehyde and about 1 molar equivalent of one or more diamines to form an alkylphenol-formaldehyde-diamine polymer and then reacting the alkylphenol-formaldehyde-diamine polymer with about 650 to about 800 molar equivalents of ethylene oxide/propylene oxide.

In another preferred aspect, the alkoxylated alkylphenol-formaldehyde-diamine polymer comprises 1 to about 12 repeating units of formula

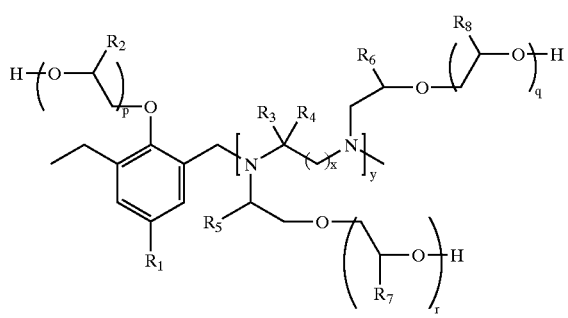

wherein $R_1$ is $C_1$–$C_{18}$ alkyl; $R_2$, $R_5$, $R_6$, $R_7$ and $R_8$ are independently selected at each occurrence from H and $CH_3$; $R_3$ and $R_4$ are independently selected at each occurrence from H, $C_1$–$C_3$ alkyl, aryl, hydroxy, alkoxy and halide; x is 1 to about 11; y is 1 to about 5; and p, q and r are independently about 5 to about 860.

In another preferred aspect of this invention, $R_3$ and $R_4$ are H.

In another preferred aspect of this invention, $R_1$ is $C_5$–$C_{12}$ alkyl.

In another preferred aspect, the alkoxylated alkylphenol-formaldehyde-diamine further comprises 1 to about 24 repeating units of formula

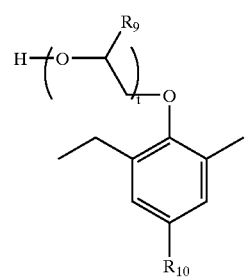

wherein $R_9$ is independently selected at each occurrence from H and $CH_3$, $R_{10}$ is $C_1$–$C_{18}$ alkyl and t is 0 to about 830.

The alkoxylated alkylphenol-formaldehyde-diamine polymer of this invention is effective for resolving a broad range of hydrocarbon emulsions encountered in crude oil production, refining and chemical processing. Specific examples include, but are not limited to, oilfield production emulsions, refinery desalting emulsions, refined fuel emulsions, and recovered oil emulsions (for example crude oil slop, used lubricant oils, and recovered oils in the steel and aluminum industries).

The alkoxylated alkylphenol-formaldehyde-diamine polymer is also useful for resolving emulsions in butadiene, styrene, acrylic acid, and other hydrocarbon monomer process streams.

In a preferred aspect of this invention, the alkoxylated alkylphenol-formaldehyde-diamine polymer is used to demulsify water-in-oil emulsions in various crude oil production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the alkoxylated alkylphenol-formaldehyde-diamine demulsifier of this invention.

In the process of resolving crude petroleum oil emulsions of the water-in-oil type, the alkoxylated alkylphenol-formaldehyde-diamine polymer of the invention is brought into contact with or caused to act upon the emulsion to be treated in any of the various methods now generally used in the petroleum industry to resolve or break crude petroleum oil emulsions with a chemical agent.

For emulsion breaker applications, the polymers can be administered in several ways. They can be used alone or blended with other emulsion breaker components. If used alone, the polymers would typically be dissolved in a suitable solvent to give a solution that comprises about 20 to about 60 percent non-volatile residue (i.e. 80–40% solvent). Most of the alkoxylated alkylphenol-formaldehyde-diamine polymers are hydrocarbon soluble. Typical solvents include toluene, xylene, light or heavy aromatic naphtha, kerosene and the like. Preferred is aromatic naphtha. If the polymers are formulated to be water soluble, the preferred solvent is water. Each component contributes to different treating characteristics when added to the crude oil emulsion due to their unique chemical properties.

In certain instances, co-solvents are required to maintain stability. Co-solvents are typically alcohols ($C_3$ to $C_6$), glycol ethers or polar aprotic solvents that are capable of dissolving both polar and non-polar materials. Typical co-solvents include isopropanol, 2-methyl-hexanol, 2-butoxyethanol, dimethylformamide and the like.

The alkoxylated alkylphenol-formaldehyde-diamine polymer may be used alone or in blends with other emulsion breaker materials including alkoxylated alkylphenol-formaldehyde polymers, complex esters, alkoxylated phenols, alkoxylated alcohols, polyethylene or polypropylene glycols and derivatives, arylsulfonates, and the like.

The alkoxylated alkylphenol-formaldehyde-diamine polymer may also be used in combination with corrosion inhibitors, viscosity reducers and other chemical treatments used in crude oil production, refining and chemical processing.

With respect to resolving emulsions encountered in crude oil production, the alkoxylated alkylphenol-formaldehyde-diamine polymer demulsifier is introduced into the crude oil emulsion by injecting beneath the surface into the oil well itself, by injecting into the crude oil at the well-head or by injecting into the crude oil process stream at a point between the well-head and the final oil storage tank. The demulsifier composition may be injected continuously or in batch fashion. The injection is preferably accomplished using electric or gas pumps.

The treated crude oil emulsion is then allowed to stand in a quiescent state until the desired separation into distinct layers of water and oil results. Once separation into distinct layers of water and oil has been effected, various means known in the art can be utilized for withdrawing the free water and separating crude oil.

In a typical process for demulsification of crude oil, a reservoir is provided to hold the alkoxylated alkylphenol-formaldehyde-diamine polymer in either diluted or undiluted form adjacent to the point where the effluent crude petroleum oil leaves the well. For convenience, the reservoir is connected to a proportioning pump capable of injecting the demulsifier into the fluids leaving the well, which then pass through a flow line into a settling tank. Generally, the well fluids pass into the settling tank at the bottom of the tank so that incoming fluids do not disturb stratification of the layers of crude petroleum oil and water which takes place during the course of demulsification.

In another preferred aspect of this invention, the water-in-oil emulsion is a refinery desalting emulsion.

The desalting process typically involves the use of pumps to move the incoming crude oil from storage tanks via piping through one or more heat exchangers. Wash water is injected into the heated oil stream and the stream is intimately mixed by an in-line mixing device. The emulsified stream flows into an electrostatic desalter vessel. There, resolution and separation of the crude oil and water effluent occur.

Injection of the demulsifier into the fluid stream can be carried out at various places along the path of the desalting process. Potential injection locations include prior to the crude oil storage tanks, on the outlet side of the crude oil storage tanks, upstream of the in-line mixer, into the wash water stream, and other potential locations.

The amount of alkoxylated alkylphenol-formaldehyde-diamine polymer demulsifier used depends on the particular crude oil emulsion being treated. Bottle tests as described herein may be conducted in order to determine the optimum dose and formulation.

With regard to specific emulsions, the following doses are typical, but may vary outside of the following ranges due to the specific characteristics of the emulsion:

Oilfield production: about 50 to about 500 ppm;

Desalting: about 1 to about 100 ppm;

Refined fuels: about 1 to about 30 ppm;

Recovered oils: about 30 to about 3000 ppm.

The foregoing may be better understood by reference to the following examples, which are presented for purposes of illustration and are not intended to limit the scope of this invention.

EXAMPLE 1

Preparation of a dodecylphenol-formaldehyde-ethylenediamine polymer

A 500-mL round-bottom three-neck flask equipped with an overhead mechanical stirrer, thermometer and Dean Stark trap (filled with solvent) is charged with 131 g (0.5 mol) of p-dodecylphenol, 30 g (0.5 mol) of ethylenediamine and 83.2 g of heavy aromatic naphtha (solvent). The mixture is heated to 75° C. and 33 g (1 mol) of 91% paraformaldehyde (in water) is added. The temperature immediately increases to about 105° C. and the reaction refluxes vigorously, producing water. After the temperature decreases to about 100° C., the mixture is heated at 130–135° C. for 2 hours. 20.5 mL of water (98% of theoretical) is collected.

EXAMPLE 2

Preparation of a nonylphenol-formaldehyde-diethylenetriamine polymer.

A 500 mL round bottom three-neck flask equipped with an overhead mechanical stirrer, thermometer and Dean Stark trap (filled with solvent) was charged with 50.2 g (0.23 mol) of p-nonylphenol, 5 g (0.05 mol) of diethylenetriamine and 34.1 g of heavy aromatic naphtha (solvent). The mixture was heated to 75 deg. C. and 10.7 g (0.322 mol) of 91% paraformaldehyde (in water) was added in increments at such a rate as to keep the temperature below 100 deg. C. The mixture was heated at 90–100 deg. C. for 1.5 h after the last of the paraformaldehyde was added, then at 195–200 deg. C. for 0.5h until a Mw of 1800–2000 amu (by GPC) was achieved.

EXAMPLE 3

Alkoxylation of a nonylphenol-formaldehyde-diethylenetriamine polymer

Nonylphenol-formaldehyde-diethylenetriamine polymer, prepared according to the method of Example 2 is charged into a 5-gallon oxyalkylation reactor, heated to 100° C. and dehydrated under a nitrogen purge until a water content of less than 0.1% is attained. The reactor is then heated to 150° C. and a calculated quantity of ethylene oxide is slowly added to the reactor while maintaining a pressure below about 50 psi. The ethylene oxide is allowed to react until the system pressure stabilizes. The reactor is cooled to ambient temperature and a weighed sample is collected and analyzed. Catalytic potassium hydroxide is added to the reactor, the reactor is heated to 100° C. and the reaction mixture is dehydrated as described above. The reactor is then heated to 120° C. and a calculated quantity of propylene oxide is added slowly while maintaining a pressure below about 50 psi and allowed to react until the pressure stabilizes. The reactor is then cooled to ambient temperature and a weighed sample is collected and analyzed. The resulting alkoxylated polymer may then be reacted with additional ethylene oxide using the procedures described above. The testing of representative alkoxylated alkylphenol-formaldehyde-diamine polymers prepared according to the methods of Examples 1–3 is described in Examples 4 and 5 below.

EXAMPLE 4

Testing of Emulsion Breakers for Desalting Applications

Desalting application tests are performed using a bottle test procedure. Raw desalter crude oil is combined with desalter wash water and emulsion breaker product in a test bottle. Typical product treat-rates are 3–30 ppm by volume. The contents are mixed by hand and are heated to about 180° F. in a water bath. The heated contents are mixed to generate an emulsion. The emulsion is transferred to a graduated container and is heated at about 180° F. for 30 minutes. The partially resolved emulsion is centrifuged for three minutes. The volume of separated water (free water) and unresolved emulsion (emulsion) are measured and recorded. Free water and emulsion values are measured in mL. Interface values are rated on a scale of 1 to 4. A value of 1 indicates a poor interface and a value of 4 indicates an excellent interface.

Results obtained using the testing procedure described above reveal that the alkoxylated alkylphenol-formaldehyde-diamine polymer demulsifiers of this invention show comparable or improved performance relative to demulsifiers based on traditional chemistries or currently available commercial products.

EXAMPLE 5

Testing of Emulsion Breakers for Oilfield Applications

Oilfield emulsion breaker tests are performed using a typical bottle test procedure that is well known to those skilled in the art. A fresh emulsion sample is collected from a field site. The site selected provides a sample that is free from emulsion breaker additives. Free water is removed and the remaining emulsion is transferred into graduated bottles. Test chemicals are added and contents of the bottle are mixed with hand agitation. Bottles are placed in a bath at field system temperature. Water separation (water drop) is measured and is recorded at timed intervals. This series of measurements indicates the ability of the test chemical to assist in water coalescence from the emulsion.

At the conclusion of the water drop test, a sample from the dry oil layer is withdrawn (thief) using a pipet. The thief sample is transferred to a centrifuge tube, is blended with a hydrocarbon solvent and emulsion breaker chemical, and is centrifuged. The amount of water in the thief sample is determined from the water collected in the bottom of the centrifuge tube. This measurement indicates the ability of the test chemical to provide dry crude oil.

Finally, the dropped free water layer is separated from the original test bottle. The remaining crude oil and emulsion is thoroughly mixed to form a composite. A composite sample is transferred to a centrifuge tube, is blended with a hydrocarbon solvent and emulsion breaker chemical, and is centrifuged. The amount of water and solids in the composite sample is determined from the quantity measured in the bottom of the centrifuge tube. This measurement indicates the ability of the test chemical to break interface emulsion.

The Results are summarized in Tables 1–3. In Tables 1–3, Crude Oil A, B, C and D represent different crude oil samples. Polymer A is alkoxylated dodecylphenol-formaldehyde-ethylenediamine polymer. Polymer B is alkoxylated nonylphenol-formaldehyde-diethylenetriamine polymer. Percents are weight percents. Values for water drop, thief slug and composite BS are measured in milliliters.

TABLE 1

Oilfield Application Test Results

| Crude Oil | Demulsifier (Polymer/% EO/% PO/% EO) | Water Drop (mL) |
|---|---|---|
| A | Standard | 42 |
|   | A/25/60/40 | 50 |
|   | A/25/80/25 | 50 |
|   | A/25/80/30 | 49 |
| B | Standard | 33 |
|   | A/25/60/0 | 38 |
|   | A/25/60/5 | 38 |
|   | A/25/60/10 | 39 |
|   | A/25/60/20 | 40 |
|   | A/25/60/25 | 39 |
|   | A/25/80/0 | 39 |
|   | A/25/80/20 | 39 |
|   | A/25/80/50 | 39 |
|   | A/25/90/5 | 39 |

TABLE 1-continued

Oilfield Application Test Results

| Crude Oil | Demulsifier (Polymer/% EO/% PO/% EO) | Water Drop (mL) |
|---|---|---|
| C | Standard | 32 |
| | A/25/90/10 | 38 |
| | A/25/90/15 | 37 |
| | A/25/90/20 | 38 |
| D | Standard | 19 |
| | A/25/90/30 | 33 |
| | B/25/80/20 | 32 |
| | B/25/80/25 | 26 |
| | B/25/80/30 | 28 |
| | B/60/80/20 | 30 |
| | B/60/80/25 | 30 |
| | B/60/80/30 | 37 |
| | B/60/80/40 | 29 |

TABLE 2

Oilfield Application Test Results

| Crude Oil | Demulsifier (X/% EO/% PO/% EO) | BS | W | Slug |
|---|---|---|---|---|
| A | Standard | 0.5 | 1.5 | 2.1 |
| | B/25/80/15 | 0.3 | 1.4 | 1.6 |
| | B/25/80/20 | 0.2 | 0.6 | 0.8 |
| | B/25/80/25 | 0.2 | 0.7 | 0.8 |
| | B/25/80/30 | 0.4 | 0.8 | 1 |
| | Standard | 0.6 | 1.2 | |
| | A/25/60/40 | 0.2 | 0.6 | |
| | Standard | 1.5 | 15 | |
| | A/25/60/50 | 0.4 | 9.5 | |
| | A/25/80/40 | 0.4 | 11 | |
| | A/25/80/50 | 1 | 9.5 | |
| B | Standard | | 2.4 | 0.6 |
| | A/25/80/5 | | 0.4 | 0.4 |
| | A/25/90/0 | | 0.2 | 0.3 |
| | A/25/90/5 | | 0.3 | 0.4 |
| | A/25/90/25 | | 0.2 | 0.3 |
| | A/25/90/30 | | 0.2 | 0.4 |
| | A/25/90/50 | | 0.2 | 0.4 |
| C | Standard | 0.8 | 3.6 | 4.4 |
| | B/60/80/15 | 0.2 | 1.2 | 2 |
| | B/60/80/20 | 0 | 1.6 | 2.4 |
| | B/60/80/25 | 0 | 0.9 | 1.6 |
| | B/60/80/30 | 0.8 | 1.2 | 2.6 |
| | B/60/90/20 | 0.6 | 0.4 | 1.2 |
| | B/60/90/25 | 0 | 0.8 | 1.2 |
| | B/60/90/30 | 0 | 1 | 1.2 |
| D | Standard | 3.2 | 0 | 2.8 |
| | A/25/90/10 | 1.8 | 0.6 | 2 |
| | A/25/90/15 | 2.4 | 0 | 1.6 |
| | A/25/90/20 | 2.4 | 0 | 1.6 |

TABLE 3

Oilfield Application Test Results

| Crude Oil | Demulsifier (X/% EO/% PO/% EO) | Water Drop (mL) | BS | W | Slug |
|---|---|---|---|---|---|
| A | Standard | 42 | 1.5 | 15 | |
| | A/25/60/40 | 50 | 1 | 8 | |
| | A/25/80/25 | 50 | 1.2 | 8 | |
| | A/25/80/30 | 49 | 1.2 | 13 | |
| B | Standard | 24 | 1.5 | 1 | 5.2 |
| | B/25/80/25 | 30 | 5.6 | 0 | 4.8 |
| | Standard | 29 | 3.2 | 0.8 | 3.6 |
| | B/60/80/20 | 33 | 3.1 | 0 | 2.4 |
| | B/60/80/25 | 31 | 4 | 0 | 3.2 |

As shown in Tables 1–3, the alkoxylated alkylphenol-formaldehyde-diamine polymers perform similarly to or outperform commercial products in a variety of crude oil emulsions.

In the current state of the art, crude oil emulsion breakers are generally mixtures of two or more "emulsion breaking intermediates", one of which drops oil from the water rapidly, while another has the ability to dry the oil. Another component may be able to minimize BS or slug values in the above described bottle test. It is very unusual for a single material to accomplish more than one of the foregoing as do the demulsifiers shown in Table 3.

Changes can be made in the composition, operation and arrangement of the method of the invention described herein without departing from the concept and scope of the invention as defined in the claims.

What is claimed is:

1. An alkoxylated alkyphenol-formaldehyde-diamine polymer prepared by reacting 1 molar equivalent of one or more diamines, 1 to about 10 molar equivalents of one or more alkylphenols and about 2 to about 14 molar equivalents of formaldehyde to form an alkylphenol-formaldehyde-diamine polymer and then reacting the alkylphenol-formaldehyde-diamine polymer with about 5 to about 3,500 molar equivalents of one or more alkylene oxides.

2. The alkoxylated alkylphenol-formaldehyde-diamine polymer of claim 1 wherein the alkylene oxides comprise ethylene oxide and propylene oxide.

3. The alkoxylated alkylphenol-formaldehyde-diamine polymer of claim 2 wherein the ethylene oxide and propylene oxide are added in block fashion.

4. The alkoxylated alkylphenol-formaldehyde-diamine polymer of claim 3 wherein the ethylene oxide and propylene oxide are added in the sequence ethylene oxide-propylene oxide.

5. The alkoxylated alkylphenol-formaldehyde-diamine polymer of claim 3 wherein the ethylene oxide and propylene oxide are added in the sequence ethylene oxide-propylene oxide-ethylene oxide.

6. The alkoxylated alkylphenol-formaldehyde-diamine polymer of claim 1 wherein the diamines are selected from the group consisting of ethylenediamine, triethylenetetramine, tetraethylenepentamine, pentaethylenehexamine, aminoethylpiperazine, 1,2-diaminocyclohexane, o-phenylenediamine and p-phenylenediamine.

7. The alkoxylated alkylphenol-formaldehyde-diamine polymer of claim 3 wherein the alkylphenol-formaldehyde-diamine polymer is reacted with about 650 to about 800 molar equivalents of alkylene oxide.

8. The alkoxylated alkylphenol-formaldehyde-diamine polymer of claim 3 prepared by reacting about 1 molar equivalent of one or more alkylphenols, about 2 to about 7 molar equivalents of formaldehyde and about 1 molar equivalent of one or more diamines to form an alkylphenol-formaldehyde-diamine polymer and then reacting the alkylphenol-formaldehyde-diamine polymer with about 650 to about 800 molar equivalents of ethylene oxide and propylene oxide.

9. The alkoxylated alkylphenol-formaldehyde-diamine polymer of claim 1 comprising 1 to about 12 repeating units of formula

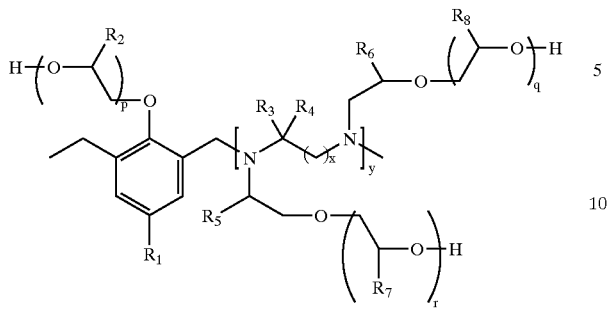

wherein $R_1$ is $C_1$–$C_{18}$ alkyl; $R_2$, $R_5$, $R_6$, $R_7$ and $R_8$ are independently selected at each occurrence from H and $CH_3$; $R_3$ and $R_4$ are independently selected at each occurrence from H, $C_1$–$C_3$ alkyl, aryl, hydroxy, alkoxy and halide; x is 1 to about 11; y is 1 to about 5; and p, q and r are independently about 5 to about 860.

10. The alkoxylated alkylphenol-formaldehyde-diamine polymer of claim 9 wherein $R_3$ and $R_4$ are H.

11. The alkoxylated alkylphenol-formaldehyde-diamine polymer of claim 9 wherein $R_1$ is $C_5$–$C_{12}$ alkyl.

12. The alkoxylated alkylphenol-formaldehyde-diamine polymer of claim 9 further comprising 1 to about 24 repeating units of formula

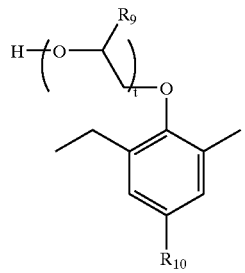

wherein $R_9$ is independently selected at each occurrence from H and $CH_3$, $R_{10}$ is $C_1$–$C_{18}$ alkyl and t is 0 about 830.

13. A demulsifier composition for resolving water-in-oil emulsions comprising one or more alkoxylated alkylphenol-formaldehyde-diamine polymers according to claim 1.

14. A method of resolving a water-in-oil emulsion comprising adding to the emulsion an effective demulsifying amount of one or more alkoxylated alkylphenol-formaldehyde-diamine polymers according to claim 1.

15. The method of claim 14 wherein the water-in-oil emulsion is a crude oil emulsion.

16. The method of claim 14 wherein the crude oil emulsion is a refinery desalting emulsion.

17. The method of claim 14 wherein the crude oil emulsion is a crude oil production emulsion.

* * * * *